United States Patent
Chow (10) Patent No.: US 10,032,077 B1
(45) Date of Patent: Jul. 24, 2018

(54) VEHICLE TRACK IDENTIFICATION IN SYNTHETIC APERTURE RADAR IMAGES

(71) Applicant: National Technology & Engineering Solutions of Sandia, LLC, Albuquerque, NM (US)

(72) Inventor: James G. Chow, Sandia Park, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 14/927,102

(22) Filed: Oct. 29, 2015

(51) Int. Cl.
*G06K 9/00* (2006.01)
*G06K 9/62* (2006.01)
*G06K 9/32* (2006.01)
*G06T 11/00* (2006.01)
*G06T 11/60* (2006.01)
*G06T 7/60* (2017.01)

(52) U.S. Cl.
CPC ....... *G06K 9/0063* (2013.01); *G06K 9/00771* (2013.01); *G06K 9/3241* (2013.01); *G06K 9/6212* (2013.01); *G06T 7/60* (2013.01); *G06T 11/001* (2013.01); *G06T 11/60* (2013.01); *G06T 2207/10044* (2013.01); *G06T 2207/20036* (2013.01); *G06T 2207/30181* (2013.01); *G06T 2207/30212* (2013.01); *G06T 2207/30232* (2013.01)

(58) Field of Classification Search
CPC ......... G06T 7/60; G06T 11/001; G06T 11/60; G06T 7/13; G06T 7/168; G06K 9/00604; G06K 9/3241; G06K 9/00791; G06K 9/00798; G06K 9/00825; G06K 9/0063; G06K 9/00771; G06K 9/6212
IPC .................................................. G06K 9/0063
See application file for complete search history.

(56) References Cited

U.S. PATENT DOCUMENTS

| | | | |
|---|---|---|---|
| 4,101,890 A | 7/1978 | Goyard | |
| 5,101,270 A * | 3/1992 | Boone | G06K 9/74 345/657 |
| 6,636,810 B1 | 10/2003 | Moore et al. | |
| 7,791,501 B2 | 9/2010 | Ioli | |
| 8,209,126 B2 | 6/2012 | Berkovitch et al. | |
| 9,389,311 B1 * | 7/2016 | Moya | G01S 13/90 |
| 9,390,329 B2 * | 7/2016 | Shreve | G06K 9/00624 |
| 2001/0048753 A1 * | 12/2001 | Lee | G06T 7/215 382/103 |
| 2002/0028019 A1 * | 3/2002 | Hemiari | G06K 9/4604 382/190 |
| 2005/0238135 A1 * | 10/2005 | Younis | G06T 11/005 378/8 |
| 2009/0238433 A1 * | 9/2009 | Rao | G06T 7/13 382/132 |

(Continued)

*Primary Examiner* — Jingge Wu
(74) *Attorney, Agent, or Firm* — Medley, Behrens & Lewis, LLC (57) ABSTRACT

Various technologies pertaining to identification of vehicle tracks in synthetic aperture radar coherent change detection image data are described herein. Coherent change detection images are analyzed in a parameter space using Radon transforms. Peaks of the Radon transforms correspond to features of interest, including vehicle tracks, which are identified and classified. New coherent change detection images in which the features of interest and their characteristics are signified are then generated using inverse Radon transforms.

18 Claims, 8 Drawing Sheets

(56) References Cited

U.S. PATENT DOCUMENTS

| | | | |
|---|---|---|---|
| 2011/0096180 A1* | 4/2011 | McCloskey | G06T 5/003 348/208.4 |
| 2012/0207353 A1* | 8/2012 | Zhao | G06K 9/00785 382/103 |
| 2013/0163843 A1* | 6/2013 | Park | G06T 7/0012 382/132 |
| 2013/0169470 A1 | 7/2013 | Emery et al. | |
| 2015/0312549 A1* | 10/2015 | Georgiev | H04N 13/0022 348/46 |
| 2015/0379361 A1* | 12/2015 | Boulanger | G06T 7/73 701/2 |

* cited by examiner

VEHICLE TRACK IDENTIFICATION IN SYNTHETIC APERTURE RADAR IMAGES

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Synthetic aperture radar (SAR) imaging is now being widely used to provide high-level, high-resolution images for surveillance, military, and law enforcement purposes. As the demand for more sophisticated intelligence information grows, coherent change detection (CCD) technology is increasingly being used for its ability to indicate change in a scene over time based upon SAR images of the scene. Furthermore, the automated extraction of intelligence from raw surveillance data has become necessary given the immense volume of such data being generated and the limited time available for analysts to process it. Automated image analysis is a promising solution to the problem of limited analyst manpower, but ordinary image processing techniques are often not robust enough to provide accurate interpretations of image data that may exhibit wide variation in image quality and the nature of scenes depicted. Existing techniques for identification of vehicle tracks in a scene generally focus on extraction of information directly from pixels in an image of the scene. These direct image processing techniques, though, are often prone to failure in high noise environments.

SUMMARY

The following is a brief summary of subject matter that is described in greater detail herein. This summary is not intended to be limiting as to the scope of the claims.

Various technologies for automated identification and display of features of interest, such as vehicle tracks, in CCD images are described herein. In an example, a computing system is used to generate a set of CCD images from a number of SAR images of the same scene taken at several time intervals, and to analyze Radon transforms of portions of those CCD images to detect certain change features (like vehicle tracks and other ground disturbances as indicated by moved earth). These Radon transforms simplify the problem of machine detection of ground disturbance features by shifting the problem from detecting pixel features in images directly to detecting Radon transform peaks in a parameter space. Once these Radon transforms are calculated and their peaks detected, the angle and distance parameters of the transform may be used to identify and classify certain image features such as, for example, the location of vehicle tracks in a CCD image and the width of the tracks. In an additional example, inverse Radon transforms may be computed from the Radon transforms to generate new CCD images. Information derived from the detection of peaks in the Radon transform may optionally be used to distinguish certain identified image features in these new inverse Radon transform images.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to the identification of vehicle tracks and other features of interest in coherent change detection (CCD) imagery are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

The disclosure is directed to systems and methods for identifying vehicle tracks in synthetic aperture radar (SAR) coherent change detection (CCD) images. CCD images have in the past been examined by human analysts to identify features of interest, but there is a current need to at least partially automate this examination and identification to increase the volume of images and data capable of being analyzed and to reduce the time needed to analyze existing images and data. Current techniques include topological analysis by examining the derivatives of candidate points that are then linked using splines, and spatial analysis in which a local neighborhood around a candidate pixel is examined to match neighboring pixels to an anticipated pattern or template. These techniques focusing on image pixel data, however, are brittle in high noise or clutter environments, and may yield failed detections or false positives that reduce confidence in the accuracy of automated results.

In exemplary embodiments, the disclosure describes systems and methods for identifying vehicle tracks in CCD images through analysis of Radon transforms. Systems and methods described herein are applicable to a wide range of problems, particularly in military and police surveillance. CCD imagery is especially useful in indicating manmade change when the collection interval between SAR image pairs is small enough that natural temporal change in the images is negligible (e.g., between 5 minutes and two days). The analysis of CCD imagery through the use of Radon transforms in a parameter space presents advantages over analysis of CCD images using direct analysis of individual pixel data, particularly in robustness to noise and other artifacts.

Figure 1:
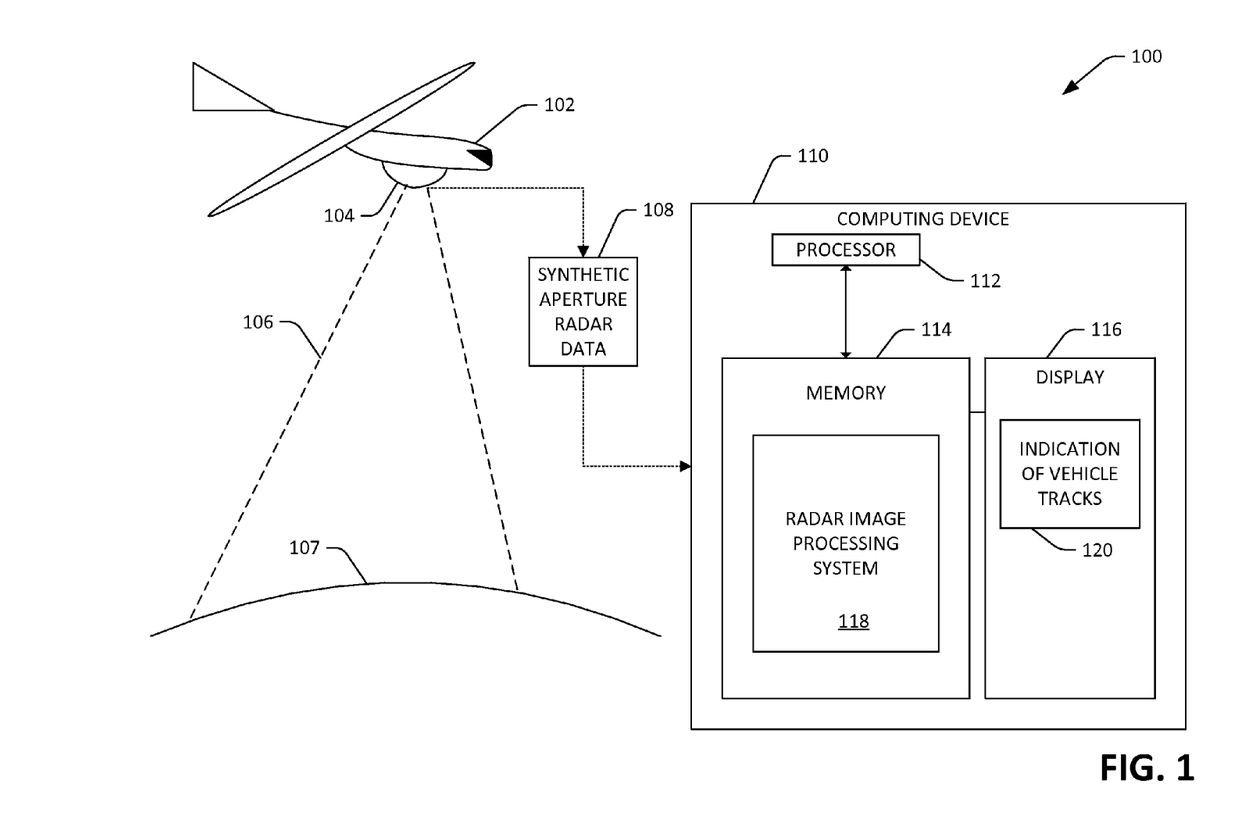
FIG. 1 is a diagram of an exemplary system that facilitates receiving and processing SAR data to display CCD images with indications of detected vehicle tracks.

With reference to FIG. 1, an exemplary system 100 that facilitates identifying vehicle tracks in a scene is illustrated. The exemplary system 100 includes an aircraft 102 equipped with a SAR system 104, where the SAR system 104 comprises an antenna and associated equipment for generating SAR imagery. The antenna of the SAR system 104 gathers SAR data 108 by scanning its field of view 106 encompassing a scene 107 comprising a portion of terrain. Several scanning passes may be made by the aircraft 102, to obtain several views of the scene 107 at different times. In the exemplary system 100, the SAR data 108 is transmitted to a computing device 110 for processing. It is to be understood, however, that said computing device 110 can be mounted in the aircraft 102 itself, or housed in a remote facility. In an alternate embodiment, the SAR data 108 can be stored on a computer-readable storage medium located aboard the aircraft 102 and accessed at a later time.

The computing device 110 comprises a processor 112, a display 116, and memory 114 comprising instructions that are executed by the processor 112. The memory 114 comprises a radar image processing system 118. The radar image processing system 118, when executed by the processor 112, constructs a CCD image of a scene 107 based upon the SAR data 108 collected by the SAR system 104. The radar image processing system 118 then generates a Radon transform of a portion of the CCD image of the scene, and analyzes the Radon transform to find a peak or peaks in the Radon transform. The radar image processing system 118 identifies vehicle tracks in the CCD image based upon the Radon transform peak(s). The radar image processing system, responsive to identifying the vehicle tracks in the CCD image, can cause graphical data (an indication of vehicle tracks 120) to be presented on a display 116, wherein the graphical data can indicate that the scene 107 includes vehicle tracks and can optionally further indicate a location of the vehicle tracks in the scene 107. For example, the indication of vehicle tracks 120 may be a highlighted portion of an image of the scene 107, wherein the image of the scene 107 can be a SAR image of the scene 107, a CCD image of the scene 107 constructed based upon the SAR data 108, a new CCD image of the scene 107 in which vehicle tracks are displayed in a particular color, etc. In an example, the indication of vehicle tracks 120 may be a second CCD image of the scene 107 generated by computing an inverse Radon transform of the Radon transform used to identify the vehicle tracks. In yet another example, metadata indicating the presence of vehicle tracks may be assigned to SAR or CCD images generated from the SAR data 108, such that the images can be indexed by the metadata in computer-readable storage for later retrieval upon issuing a query to the computing device 110.

Figure 2:
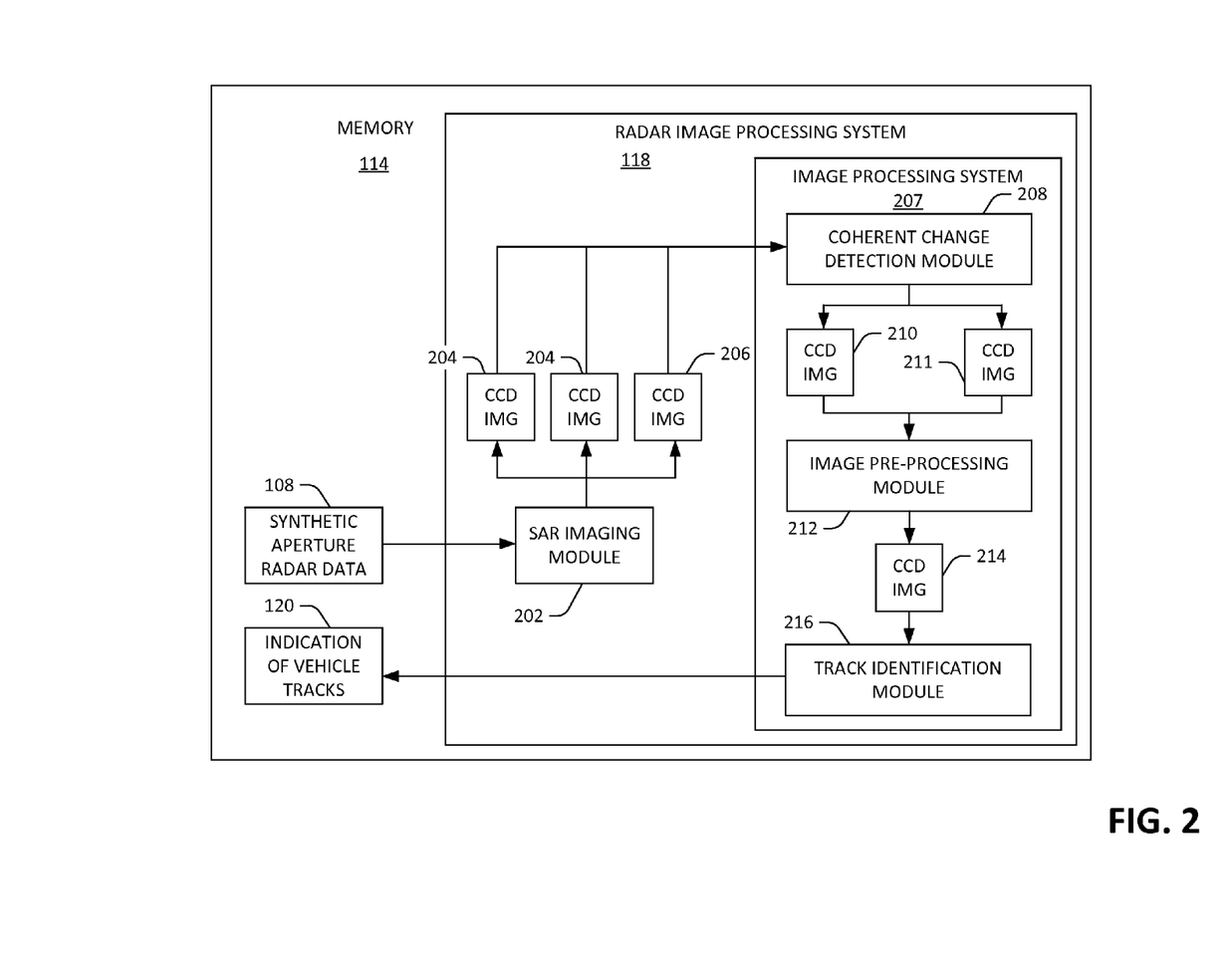
FIG. 2 is a functional block diagram of an exemplary system that facilitates extraction of vehicle track data from a set of SAR images.

Referring now to FIG. 2, a functional block diagram illustrating exemplary contents of the memory 114 is illustrated. The memory 114, as indicated above, comprises the radar image processing system 118. The memory 114 can further comprise the SAR data 108 that serves as an input to that system 114. The SAR data 108 is received, for example, from an aerial vehicle, such as an airplane, a drone, etc., wherein the SAR data 108 comprises raw measurements generated by the SAR system 104.

The radar image processing system 118 comprises a SAR imaging module 202 that generates SAR images 204-206 of the scene 107 based upon the SAR data 108. In the embodiment shown, three or more SAR images 204-206 are generated. These SAR images 204-206 comprise views of the same scene 107 taken at different times. As such, there may be variation among the images 204-206, though they all should depict the same basic scene.

The image processing system 207 comprises a CCD module 208, an image pre-processing module 212, and a track identification module 216. The image processing system 207 takes as input at least two of the SAR images 204-206, and processes them to ascertain whether the scene 107 includes vehicle tracks. The SAR images 204-206 can be registered with one another, such that they reside in a common coordinate system. With more particularity, the coherent change detection module uses the SAR images 204-206 to generate CCD images 210-211 of the scene 107 using any suitable techniques for generating CCD images. In an example, the CCD module 208 processes a first SAR image 204 and a second SAR image 205 to generate a first CCD image 210, and processes a third SAR image 206 and the second SAR image 205 to generate a second CCD image 211, where the second CCD image 211 is temporally disjoint from the first CCD image 210.

In the illustrated exemplary embodiment, the image pre-processing module 212 generates a third CCD image 214 of the scene 107 by jointly pre-processing the first and second temporally disjoint CCD images 210-211. Pre-processing of CCD images is carried out to enhance features of interest and mitigate clutter before sending the third CCD image 214 to the track identification module 216. The joint pre-processing of the CCD input images 210 and 211 may be accomplished through any one of several techniques, including, among other possibilities, principal component analysis (PCA), independent component analysis (ICA), computation of the normalized coherence product (NCP) of the images 210 and 211, and computation of the difference change product (DCP) of the images 210 and 211. PCA and ICA proceed according to standard computational methods. The NCP computes the ratio of the CCD images 210 and 211 to remove areas of low coherence from shadow or low radar returns by normalizing corresponding pixels in each image that have similar coherence. The DCP, like the NCP, is used to mitigate areas having low coherence from shadow or low radar returns. The DCP is computed by taking the difference between two incomplete beta function ratios of a CCD estimator, γ, by the following equations:

$$IBFR = 5\gamma^4 - 4\gamma^5,$$

where the DCP is then given by $$DCP = IBFR_2 - IBFR_1,$$

and where $IBFR_1$ is the incomplete beta function ratio of the first CCD image 210 and $IBFR_2$ is the incomplete beta function ratio of the second CCD image 211. The output of any of the four techniques discussed above is the CCD image 214 indicating a measure of change between the two input CCD images 210 and 211. In the embodiment shown, the track identification module 216 can receive the CCD image 214 of the scene 107 as input.

The track identification module 216, described in detail below with reference to FIG. 3, identifies vehicle tracks in the CCD image 214 and generates the indication 120 as output. In an embodiment, the track identification module 216, upon identifying vehicle tracks in the CCD image 214 (and thus the scene 107), assigns a classification to the tracks (e.g., according to various characteristics) and signifies this classification in the graphical indication 120. In an example, the classification of vehicle tracks may indicate width of vehicle tracks. For instance, the classification can indicate that the vehicle tracks are of a first width (e.g., rather than a second width). In another example, the classification of vehicle tracks can indicate that the vehicle tracks are of a second width (e.g., rather than the first width). The track identification module 216 can signify this classification by assigning a first color to tracks having the first width and assigning a second color to tracks having the second width in the graphical indication 120 (e.g., where the graphical indication 120 is an image of the scene 107). An analyst can then view the graphical indication 120 and see (at a glance) which tracks were made by, for example, a passenger vehicle with the first track width and which were made by a commercial or cargo vehicle with the second track width. Thus, it is to be understood that a color value can be assigned to a pixel in an image, where the color value corresponds to an attribute of the vehicle track (e.g., vehicle track classification, track width, number of axles of a vehicle, tire pressure, etc.)

Figure 3:
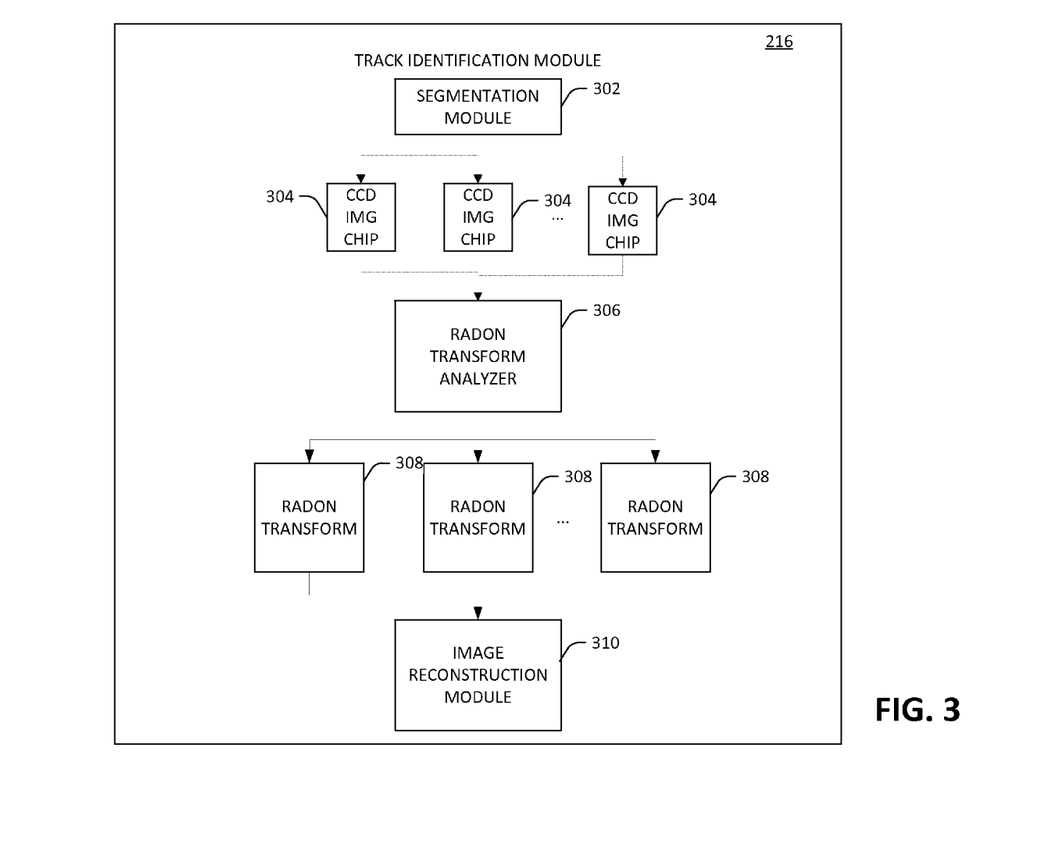
FIG. 3 is a functional block diagram of an exemplary system that facilitates extraction of vehicle track information from CCD images and construction of new CCD images.

Referring now to FIG. 3, a functional block diagram of the track identification module 216 is shown. The track identification module 216 comprises a segmentation module 302 that segments the input CCD image 214 into a plurality of CCD image chips 304. In an example, the CCD image chips can be of equal size, although in other embodiments the chips may be of different size and/or spatial resolution. The track identification module 216 further includes a Radon transform analyzer 306 that computes Radon transforms 308 of each of the CCD image chips 304, and detects the Radon transform peaks in the Radon transforms 308. The track identification module 216 also comprises an image reconstruction module 310 that generates new CCD images of the scene 107 by taking inverse Radon transforms of the plurality of the Radon transforms 308 and stitching them together.

Figure 4:
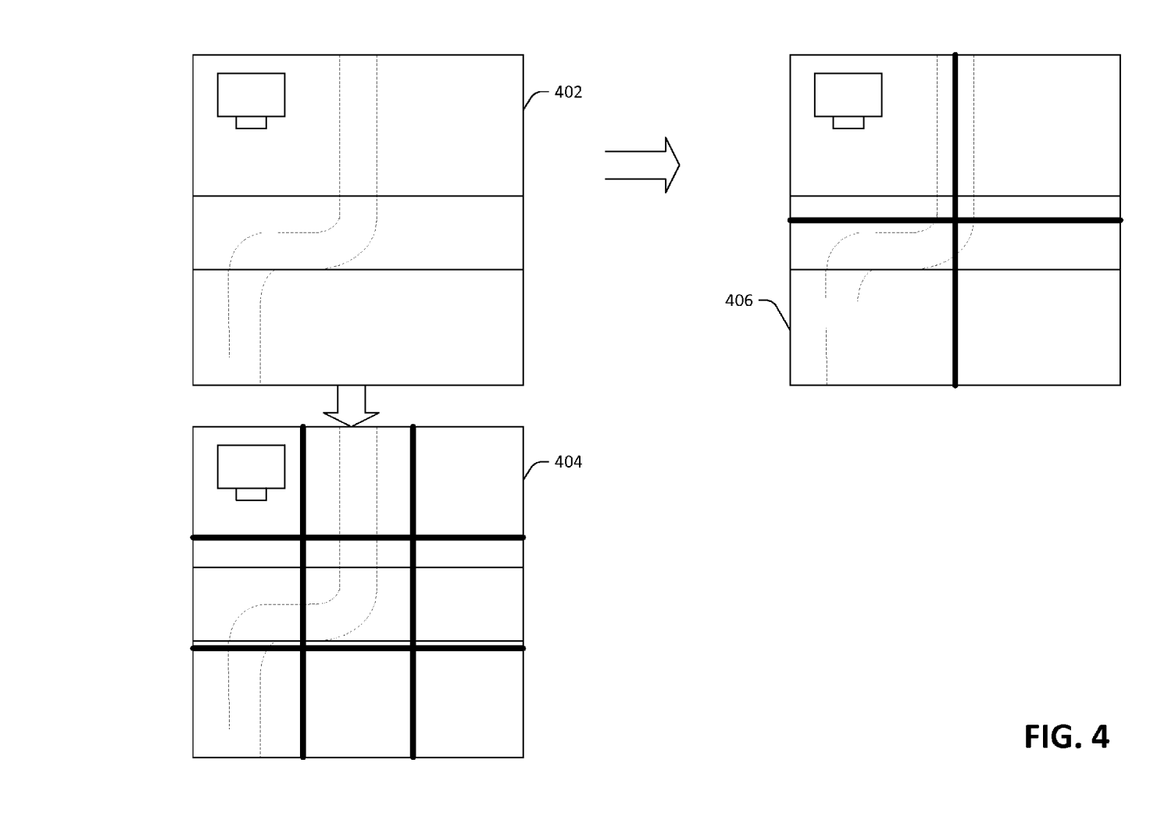
FIG. 4 is an exemplary illustration of the segmentation of CCD images for processing by a track identification module.

In an example, the segmentation module 302 and the Radon transform analyzer 306 can, in conjunction, use a pseudo-localized Radon transform when computing the Radon transforms of the CCD image 214. More specifically, the segmentation module 302 can segment the input CCD image 214 using multiple image "windows" to form the image chips 304, and the Radon transforms 308 of the chips 304 can be analyzed to identify peaks therein, wherein the peaks are indicative of existence of vehicle tracks in the CCD image chips 304. This process may be repeated with multiple window sizes, and the results of the extraction from the Radon transforms fused to mitigate artifacts. Referring to FIG. 4, an example of segmented CCD images is shown. An input CCD image 402 to the segmentation module 218 is segmented into a first image 404 of pieces of a first equal size and a second image 406 of pieces of a second equal size. The use of different window sizes in the segmentation process helps to mitigate artifacts that may appear when inverse Radon transforms are undertaken to reconstruct track detection images, as described in greater detail below with respect to FIG. 5.

Referring again to FIG. 3, the Radon transform analyzer 306 performs a Radon transform on each of the CCD image chips 304. Also known as a sinogram, the Radon transform is an integral function or projection over lines in two dimensions, typically angle (θ) and distance (ρ), and is used extensively in tomography. The forward Radon transform for a function g(x,y) is given by:

$$G(\rho, \theta) = \int \int_{-\infty}^{\infty} g(x, y) \delta(\rho - x\cos\theta - y\sin\theta) \, dx dy$$

where δ is the Dirac delta function. The Radon transform is used in the context of identifying vehicle tracks in CCD images to convert the problem from curve extraction from image pixel data to the more manageable problem of peak detection in the Radon parameter space. The Radon transform is also robust to cluttered and noisy images because a peak in the Radon parameter space is associated with detection of collinear pixels in the input image, while noise and clutter are generally random. After calculating the Radon transform 308 of the CCD image chips 304, the Radon transform analyzer 306 can apply a threshold to the Radon transform to isolate a peak or peaks corresponding to potential vehicle tracks. This Radon transform threshold is determined based on the minimum length of a vehicle track in a CCD image chip 304, a threshold grayscale value at which to declare a pixel to be a detected change candidate for a vehicle track, and a normalization factor to compensate for any scaling factors used in the Radon transform process.

The Radon transform analyzer 306 then detects the peaks of the Radon transforms 308. The Radon transform analyzer 306 can detect peaks of the Radon transforms 308 using a Hough transform peak detection algorithm. The Radon transform analyzer 306 can detect peaks in isolation or pairs of peaks, where a single peak may be representative of a single track (e.g., created by a motorcycle or a car where two wheels were on a soft shoulder and the other two wheels were on hard pavement). To reliably detect pairs of peaks in the presence of image noise, the Radon transform analyzer 306 can employ a matched filter template of a two-dimensional Gaussian mixture centered at the Hough peak, where the magnitude of the Gaussian mixture is equal to the magnitude of the Hough peak. The template is correlated in a region about the Hough peak, and the maximum of the correlation is reached where the separation distance from the origin is equal to the separation distance of the expected pair of peaks in the Radon space. The existence of a pair of peaks may be confirmed by checking if the pixel intensity in the Radon parameter space is greater than the Radon threshold value described above. For a pair of peaks, the pixel intensity at the expected peak will be greater than this threshold value, while a pixel intensity below the threshold value at one of the expected peaks indicates that only a single true peak is present. Analysis of the detected peaks reveals information about the location of vehicle tracks, as well as the track width of vehicles when a pair of tracks is present and an associated pair of Radon transform peaks is identified. Angle and distance parameters of the Radon transform peaks indicate where in the CCD image vehicle tracks have been identified, while the separation distance between peaks yields information about the width of track pairs.

The image reconstruction module 310 then receives the plurality of Radon transforms 308 and performs an inverse Radon transform to each of the Radon transforms 308, generating new image chips and stitching them together to construct a final track detection image of the scene 107 depicted in the original SAR images 204-206, with identified tracks indicated in the track detection image. The image reconstruction module 310 first computes inverse Radon transforms of each of the Radon transforms 308 of the CCD image chips 304. The inverse Radon transform results in new CCD image chips corresponding to the portion of the scene depicted in the respective input CCD image chips 304. Since the Radon transform is not a one-to-one mapping, the inverse Radon transform process may introduce line artifacts. In an embodiment, the image reconstruction module 310 may reduce these artifacts through a process of morphological erosion of the inverse Radon transform images with a circular disk structuring element, which allows the rejection of clutter and artifacts without requiring knowledge of the orientation of features of interest a priori. The inverse Radon transform image chips are then reassembled into a complete track detection image that may be sent to the display 116. In the track detection image, pixels identified as belonging to vehicle tracks in the peak detection process may be signified in some way as representing vehicle tracks, for example they may be assigned particular pixel values. Pixel values may be assigned based on the track width, whether a track is a single track or a pair of tracks, or other pertinent information that may be discerned from analysis of the Radon transform peaks.

Figure 5:
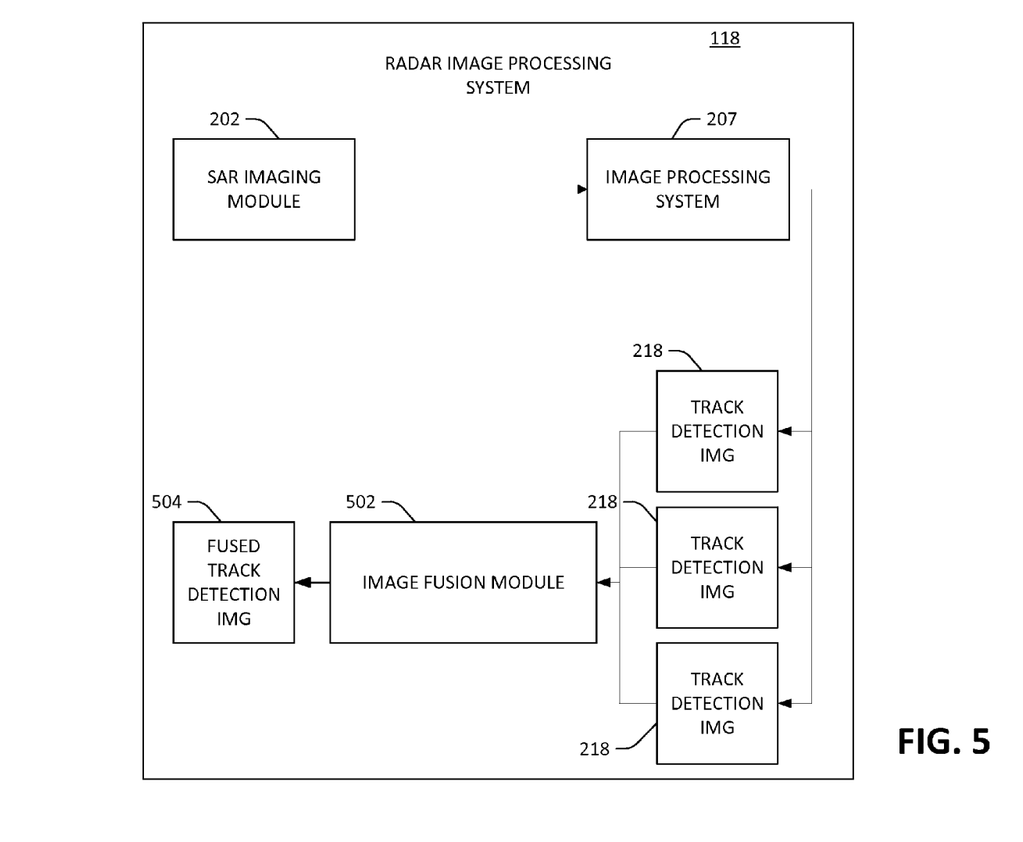
FIG. 5 is a functional block diagram of an exemplary system that facilitates mitigation of artifacts generated in track detection images.

Referring now to FIG. 5, a functional block diagram of the radar image processing system 118 is depicted, where the radar image processing system 118 comprises an image fusion module 502 that is configured to mitigate line artifacts arising out of the inverse Radon transform process used to create the track detection image. In FIG. 5, three or more track detection images 218 (e.g., images that highlight vehicle tracks) are generated by the image reconstruction module 310, each constructed by using different window sizes. Inverse Radon transform line artifacts are dependent on the window size used, and the most desirable segmentation window sizes will depend on the resolution of the input images. If windows are too small, details in the curves of tracks cannot be extracted, and if windows are too large then too many image artifacts may be present. Since inverse Radon transform line artifacts are dependent on the window size used to segment the CCD image in the track identification process, each of the track detection images 218 using different segmentation window sizes will exhibit different artifacts. The image fusion module 502 then performs a comparison among the images to eliminate window-size dependent artifacts, while retaining detected tracks, which are independent of the window size used to segment the input images. Detected tracks will be present in each of the images, while line artifacts will differ from image to image and may be rejected using a logical AND or a voting system on a per-pixel basis across all of the track detection images. The final result of the fusion process is a fused track detection image 504, wherein detected tracks are identified, classified, and signified according to certain characteristics as described above.

Other techniques for the mitigation of artifacts in track detection images may be implemented in various elements of the exemplary systems illustrated and described in detail above. For example, detecting vehicle tracks in cluttered urban environments may be more challenging than in open rural areas. Referring again to FIG. 2, the image preprocessing module 212 can apply an image mask to the CCD image 214 to block out structures to reduce the possibility of artifacts and false track detections in the track detection image 218 generated by the exemplary system. In an embodiment, the image mask may be a relative interferometric height mask, which can be computed based upon any suitable height map. Exemplary height maps include a Digital Elevation Model (DEM), which is typically created using LiDAR data. In another example, interferometric SAR images can be used to create the height maps, where such a height map can be computed from the unwrapped interferogram computed by the registration of a complex SAR image pair. An interferometric height image exhibits higher variance where vertical discontinuities exist and appears "smooth" in flat regions, thus allowing buildings to be isolated from other terrain. The interferometric height mask, as noted, requires a pair of SAR images, which must have a sufficient vertical baseline (e.g., ten or more meters vertical offset in a repeat trajectory of an aircraft on a second scanning pass) while simultaneously having overlap in the k-space. Collection of these images in the first instance may prove challenging. Thus, in an alternate embodiment, the image pre-processing module 212 can use an entropy image mask to generate an urban clutter mask from a single SAR image. An entropy image is expected to indicate low entropy in smooth, open areas of terrain, while indicating higher entropy in areas showing bright, rigid objects such as structures or vehicles. This approach may be susceptible to indicating low entropy in regions of shadows or no radar return, which are incapable of supporting change signatures in CCD imagery.

Figure 6:
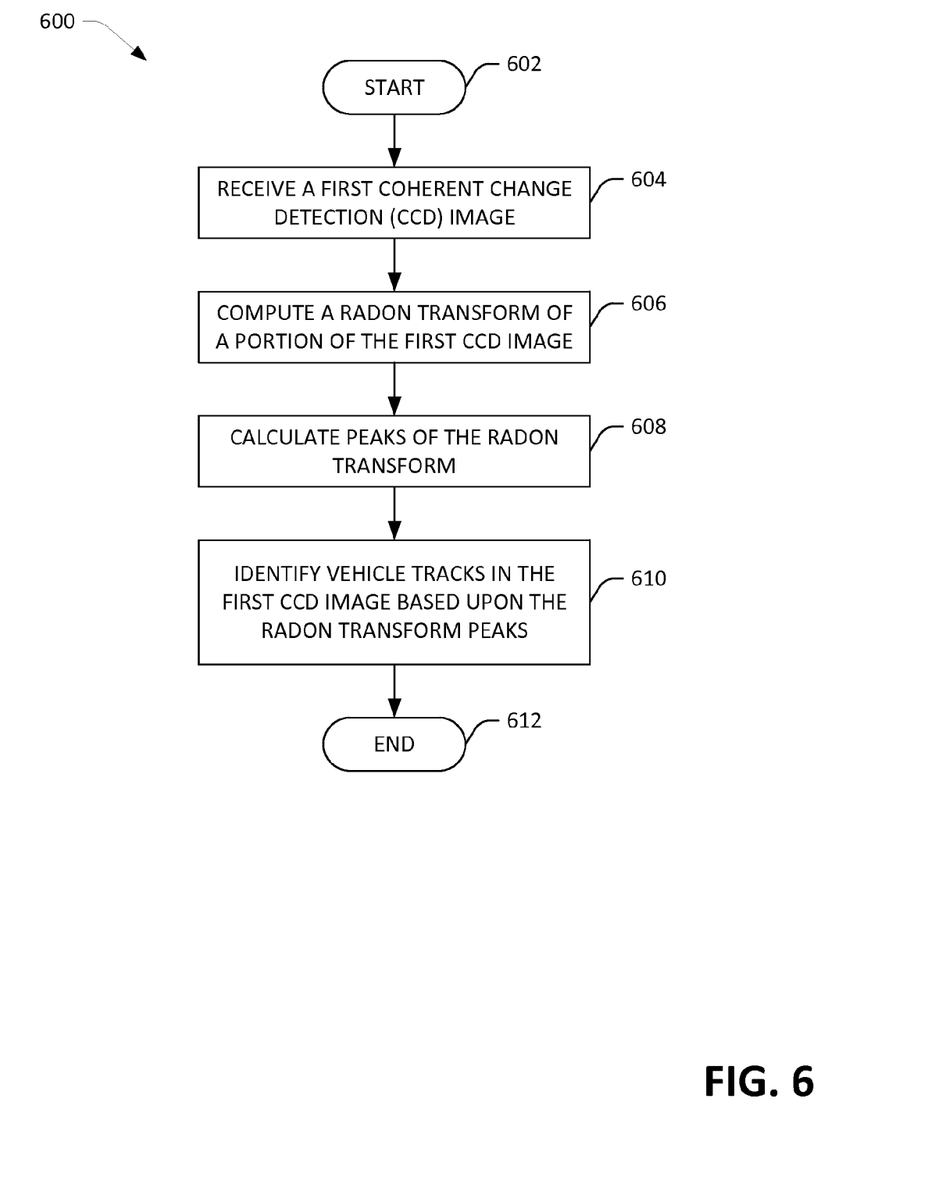
FIG. 6 is a flow diagram that illustrates an exemplary methodology for identifying vehicle tracks in CCD images using Radon transform analysis.
Figure 7:
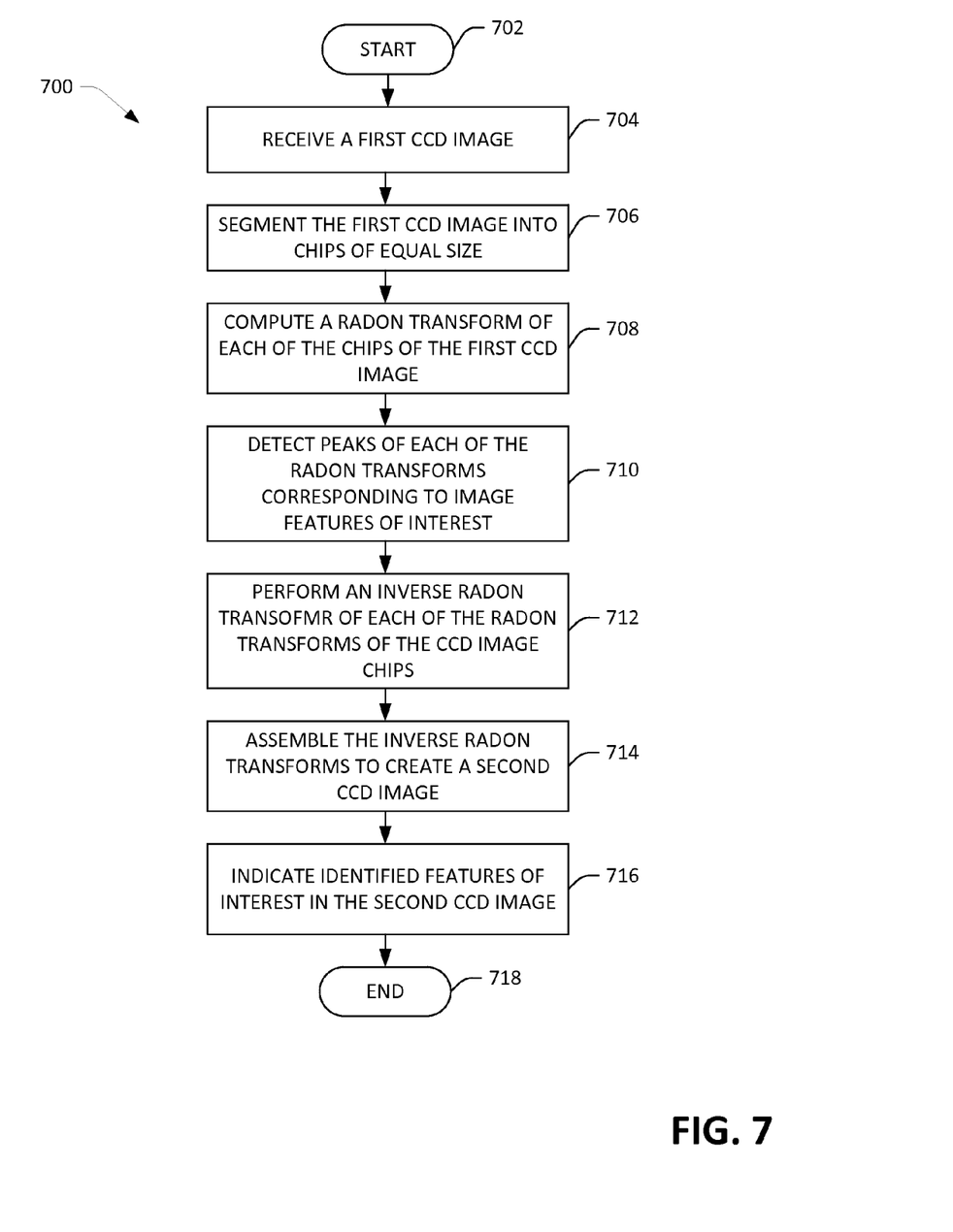
FIG. 7 is a flow diagram that illustrates an exemplary methodology for generating CCD images in which vehicle tracks are signified from existing CCD image data.

FIGS. 6-7 illustrate exemplary methodologies relating to the detection of vehicle or other tracks in CCD images. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 for detecting vehicle tracks in CCD images is illustrated. The methodology begins at 602, and at 604 a CCD image is received. The CCD image depicts a scene of interest, and may be generated through analysis of SAR images. At 606, a portion of the image is selected for analysis, and a Radon transform of that portion of the CCD image is computed. At 608, peaks of the Radon transform computed at 606 are calculated to glean information about possible vehicle tracks in the CCD image. Calculation of these peaks may proceed according to any suitable peak detection process, and in an exemplary embodiment the calculation of peaks is accomplished using a Hough transform. At 610, vehicle tracks are then identified in the CCD image through the analysis of the peaks of the Radon transform calculated at 608. The peaks of the Radon transform can provide information about the location of tracks in the CCD image and other track features of interest such as track width, which may be determined based on the separation distance of Radon transform peak pairs. The methodology completes at 612.

FIG. 7 illustrates an example methodology 700 in which a CCD image is analyzed and processed to generate a new CCD image of the same depicted scene with certain features of interest highlighted. The methodology begins at 702, and at 704 a first CCD image is received. At 706, the image is segmented into "chips" of an equal size to facilitate identification of features of interest. The selected size of these chips will depend on the resolution of the initial CCD image, and is selected to mitigate the generation of artifacts in later stages of the methodology, while capturing large enough portions of the original CCD image to be able to identify features of interest. At 708, Radon transforms of each of the CCD image chips are computed, and at 710 peaks of the Radon transforms are calculated that correspond to features of interest in the original CCD image, for example vehicle tracks. Inverse Radon transforms of each of the Radon transforms of the CCD image chips are calculated at 712, and morphological erosion may be applied in order to reduce line artifacts resulting from the inverse Radon transform process. The inverse Radon transform process generates new CCD image chips that are then assembled at 714 to create a second CCD image. At 716, the features of interest identified in the peak detection process are then signified in the second CCD image. The signification may include, among other things assignment of a particular color to pixels corresponding to features of interest, or other means of drawing attention to the identified features. The methodology completes at 718.

Figure 8:
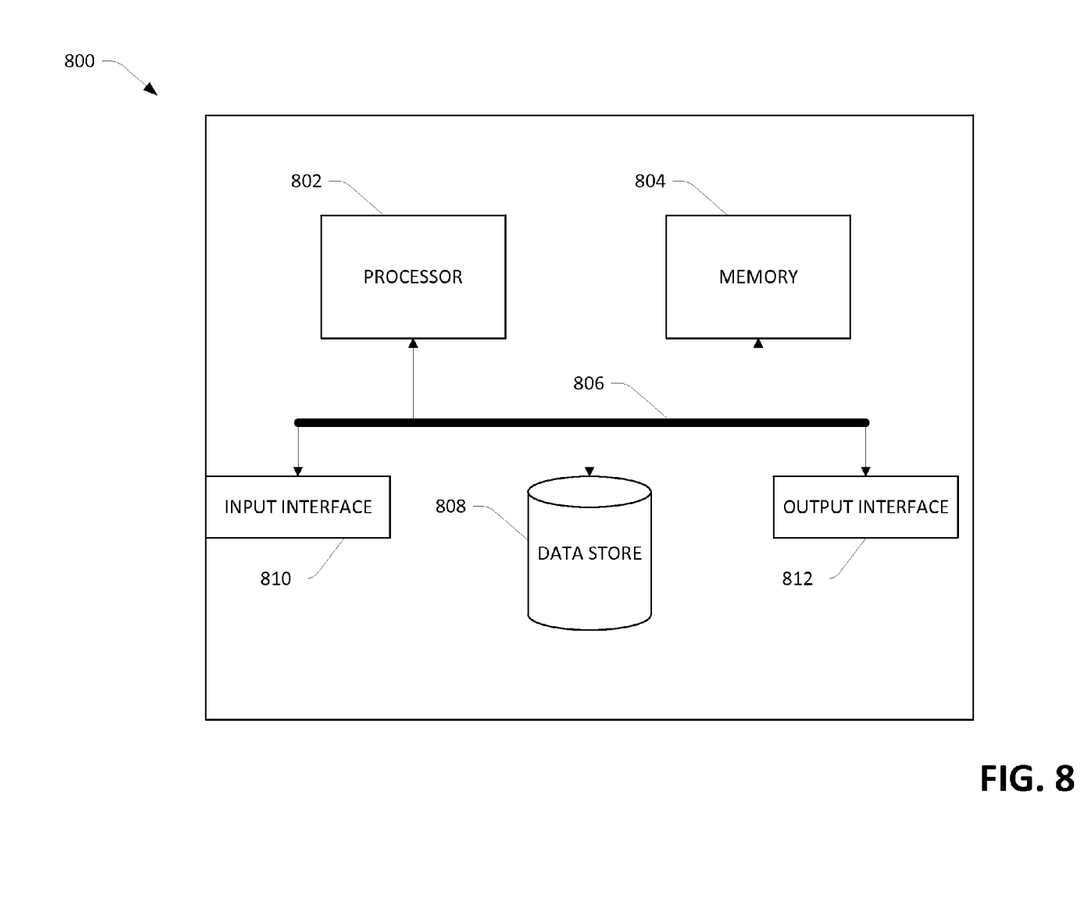
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that identifies vehicle tracks in CCD images. By way of another example, the computing device 800 can be used in a system that generates new CCD images with identified vehicle tracks indicated in some manner. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store SAR imagery, CCD imagery, Radon transform data, etc.

The computing device 800 additionally includes a data store 808 that is accessible by the processor 802 by way of the system bus 806. The data store 808 may include executable instructions, SAR data, CCD images, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
   a processor,
   a display; and
   memory that comprises instructions that, when executed by the processor, cause the processor to perform acts comprising:
   responsive to receiving a first coherent change detection image of a scene, calculating a Radon transform of at least a portion of the first coherent change detection image;
   identifying a peak of the Radon transform;
   identifying a vehicle track in the scene based upon the identified peak of the Radon transform;
   generating a second coherent change detection image by calculating an inverse Radon transform of the Radon transform;
   assigning a color value to a pixel of the second coherent change detection image, the color value corresponding to an attribute of the vehicle track; and
   displaying the second coherent change detection image on the display, wherein the second coherent change detection image captures the vehicle track.

2. The computing device of claim 1, wherein identifying the vehicle track in the scene comprises identifying a pair of vehicle tracks, and wherein the pixel of the second change detection image corresponds to the pair of vehicle tracks.

3. The computing device of claim 1, wherein identifying the vehicle track comprises identifying a pair of vehicle tracks, the acts further comprising:
   responsive to identifying the pair of vehicle tracks in the scene, computing a width of the pair of vehicle tracks based upon a separation of the peaks of the Radon transform; and
   outputting graphical data to the display indicating the width of the pair of vehicle tracks.

4. The computing device of claim 3, wherein outputting graphical data indicating the width of the pair of vehicle tracks comprises:
   assigning a second color value to a second pixel of the second coherent change detection image corresponding to the pair of vehicle tracks; and
   displaying the second coherent change detection image with the second color value assigned to the second pixel.

5. The computing device of claim 1, wherein identifying the vehicle track comprises identifying a first pair and a second pair of vehicle tracks, the acts further comprising:
   responsive to identifying the first pair of vehicle tracks in the scene, computing a width of the first pair of vehicle tracks based upon separation of the peaks of the Radon transform;
   assigning a second color value to a second pixel of the second coherent change detection image corresponding to the first pair of vehicle tracks;
   responsive to identifying the second pair of vehicle tracks in the scene, computing a width of the second pair of vehicle tracks based upon separation of the peaks of the Radon transform;
   comparing the computed width of the first pair of vehicle tracks and the computed width of the second pair of vehicle tracks; and
   responsive to the computed width of the second pair of vehicle tracks being different from the computed width of the first pair of vehicle tracks, assigning a third color value to a third pixel of the second coherent change detection image corresponding to the second pair of vehicle tracks.

6. The computing device of claim 1, wherein generating the second coherent change detection image comprises performing morphological erosion on the inverse Radon transform.

7. The computing device of claim 1, the acts further comprising:
   prior to identifying the peak of the Radon transform, applying a threshold mask to the Radon transform to generate a filtered Radon transform, wherein the threshold mask is based upon at least a minimum length of a vehicle track and a grayscale value of pixels corresponding to vehicle tracks in the first coherent change detection image, wherein identifying the peak of the Radon transform comprises identifying a peak of the filtered Radon transform, and wherein identifying the vehicle track in the scene based on the peak of the Radon transform comprises identifying the vehicle track in the scene based on the peak of the filtered Radon transform.

8. The computing device of claim 1, the acts further comprising applying a mask to the first coherent change detection image before calculating the Radon transform, the mask based upon a height map of the scene.

9. A method comprising:
   receiving a first coherent change detection image of a scene;
   computing a Radon transform of at least a portion of the first coherent change detection image;
   identifying a peak of the Radon transform;
   identifying a vehicle track in the scene based upon the identified peak of the Radon transform;
   generating a second coherent change detection image of the scene by calculating an inverse Radon transform of the Radon transform; and
   assigning a color value to a pixel of the second coherent change detection image corresponding to the vehicle track; and displaying the second coherent change detection image with the color value assigned to the pixel.

10. The method of claim 9, further comprising:
segmenting the first coherent change detection image into a first plurality of pieces of a first equal size, wherein computing the Radon transform of at least a portion of the first coherent change detection image comprises:
   computing a Radon transform of each of the pieces of the first plurality of pieces, wherein identifying the peak of the Radon transform comprises:
      identifying peaks of each of the Radon transforms of the first plurality of pieces;
computing an inverse Radon transform of each of the Radon transforms of the first plurality of pieces;
forming the second coherent change detection image of the scene by assembling the inverse Radon transforms of the first plurality of pieces, wherein identifying the vehicle track in the scene comprises:
   identifying a vehicle track in the second coherent change detection image based upon the identified peak of each of the Radon transforms of the first plurality.

11. The method of claim 9, further comprising generating the first coherent change detection image, wherein generating the first coherent change detection image comprises:
   receiving a third and a fourth coherent change detection image; and
   jointly preprocessing the third and fourth coherent change detection images to form the first coherent change detection image.

12. The method of claim 11, wherein jointly preprocessing the third and fourth coherent change detection images comprises one of the following:
   performing principal component analysis on the third and fourth coherent change detection images;
   performing independent component analysis on the third and fourth coherent change detection images;
   computing the normalized coherence product of the third and fourth coherent change detection images; or
   computing the difference change product of the third and fourth coherent change detection images.

13. The method of claim 9, further comprising applying a threshold mask to the Radon transform before identifying the peak, the threshold mask based upon a minimum pixel length of vehicle tracks in the first coherent detection image and a pixel intensity value of a pixel corresponding to a vehicle track in the first coherent detection image.

14. The method of claim 9, wherein identifying the vehicle track comprises identifying a pair of vehicle tracks, the method further comprising:
   computing a width of the pair of vehicle tracks based on a separation between peaks of the Radon transform; and
   displaying an indication of the width of the pair of vehicle tracks.

15. The method of claim 9, wherein identifying the vehicle track comprises identifying a first pair of vehicle tracks and a second pair of vehicle tracks, the method further comprising:
   computing a first width of the first pair of vehicle tracks based on a separation between peaks of the Radon transform;
   computing a second width of the second pair of vehicle tracks based on a separation between peaks of the Radon transform; and
   comparing the first width and the second width, wherein displaying the indication that the second coherent change detection image includes the vehicle track comprises depicting the first pair of vehicle tracks and the second pair of vehicle tracks in different colors in the second coherent change detection image based on their track width.

16. A computer-readable storage medium comprising instructions that, when executed by a processor, cause the processor to perform the following acts:
   responsive to receiving a first coherent change detection image of a scene, calculating a Radon transform of at least a portion of the first image;
   identifying a peak of the Radon transform;
   identifying a vehicle track in the scene based on an angle and distance parameters of the peak of the Radon transform;
   computing an inverse Radon transform of the Radon transform to create a second coherent change detection image;
   assigning a color value to one or more pixels corresponding to the one or more vehicle tracks in the second coherent change detection image; and
   displaying the second coherent change detection image.

17. The computer-readable storage medium of claim 16, the acts further comprising:
   identifying a width of the vehicle track based upon the peak of the Radon transform; and
   displaying an indication of the width of the vehicle track in the second coherent change detection image.

18. The computer-readable storage medium of claim 16, the acts further comprising generating the first coherent change detection image, wherein generating the first coherent change detection image of the scene comprises:
   receiving third and fourth coherent change detection images; and
   jointly preprocessing the third and fourth coherent change detection images to form the first coherent change detection image.

* * * * *